US005773065A

United States Patent [19]

Clauzure

[11] Patent Number: 5,773,065
[45] Date of Patent: Jun. 30, 1998

[54] PROCESS FOR ROASTING COFFEE

[75] Inventor: André Clauzure, Grisy-Suisnes, France

[73] Assignee: Pernod Ricard, Paris, France

[21] Appl. No.: 617,802

[22] PCT Filed: Sep. 5, 1994

[86] PCT No.: PCT/FR94/01037

§ 371 Date: Mar. 7, 1996

§ 102(e) Date: Mar. 7, 1996

[87] PCT Pub. No.: WO95/07026

PCT Pub. Date: Mar. 16, 1995

[30] Foreign Application Priority Data

Sep. 7, 1993 [FR] France ................................. 93 10609

[51] Int. Cl.$^6$ ........................................................ A23F 5/00
[52] U.S. Cl. .......................... 426/466; 426/461; 426/473; 426/511
[58] Field of Search ..................... 426/466, 467, 426/473, 447, 461, 511

[56] References Cited

U.S. PATENT DOCUMENTS

| | | |
|---|---|---|
| 2,712,501 | 7/1955 | Hale et al. .............................. 426/466 |
| 3,088,825 | 5/1963 | Topaalian et al. ....................... 426/447 |
| 3,801,716 | 4/1974 | Mahlmann et al. ..................... 426/466 |
| 4,540,591 | 9/1985 | Dar et al. ................................ 426/466 |
| 5,019,413 | 5/1991 | Becker et al. .......................... 426/466 |
| 5,160,757 | 11/1992 | Kirkpatrick et al. ................... 426/466 |

FOREIGN PATENT DOCUMENTS

| | | |
|---|---|---|
| 0366896 | 5/1990 | European Pat. Off. . |
| 2245293 | 4/1975 | France . |
| 3-123441 | 5/1991 | Japan . |
| 609495 | 10/1948 | United Kingdom . |
| 1048817 | 11/1966 | United Kingdom . |

OTHER PUBLICATIONS

Patent Abstracts of Japan, vol. 15, No. 324 (C–0859) Aug. 19, 1991.

Primary Examiner—George Yeung
Attorney, Agent, or Firm—McDermott, Will & Emery

[57] ABSTRACT

A process for obtaining a ground roasted plant material is disclosed. The process includes the steps of subjecting the plant material to steam at a pressure greater than or equal to about 5 bar to roast the plant material, and releasing the pressure to expel the plant material through a grid to grind the roasted plant material.

11 Claims, No Drawings

PROCESS FOR ROASTING COFFEE

The present invention relates to a process for roasting coffee which allows the rapid production of roasted coffee and which also allows the easy production of the roasted product in the form of ground coffee.

The roasting of coffee is an essential stage in the processing of coffee.

It is a heat treatment of green coffee which produces fundamental physical and chemical modifications in the structure and the composition of the coffee, causing browning of the latter as well as the appearance and the development of the organoleptic characteristics of the so-called "roasted" coffee.

This roasting is also applied for other products such as cocoa and chicory.

The current roasting processes consist in the dry heating of green coffee until it has the desired roasting characteristics. One of the problems posed by this type of process is that the heating, while it makes it possible to develop the organoleptic qualities of the coffee, can also cause in some cases, taking into account the duration of the process, the loss of certain flavors.

In addition, a large proportion of the coffee currently marketed is in the form of ground coffee, the grinding of the coffee being performed in a separate operation, after the roasting.

The process according to the invention has the advantage of allowing a rapid roasting of the coffee and the production of a ground coffee practically in a single stage.

More particularly, the present invention relates to a process for roasting coffee, cocoa or chicory, characterized in that the green beans which have undergone any operations prior to the roasting (fermentation, and the like) or parts of the plant are subjected to the action of steam at a pressure greater than or equal to 5 bar, preferably at a pressure of between 9 and 30 bar, and this for a time sufficient to ensure a satisfactory roasting, the duration of the roasting obviously depending on the pressure and being in general less than or equal to 2 minutes, and preferably less than or equal to 1 minute.

According to the present invention, the process is preferably carried out in a sealed container, in which:

a) the green product is introduced,
b) the pressurized steam is introduced,
c) the product is left in contact with the pressurized steam for a determined time,
d) a rapid expansion is performed in order to bring the container to atmospheric pressure, and this through an appropriate orifice such as a grid,
e) which makes it possible to recover the roasted coffee, and, when the expansion is performed by returning to the lower pressure through a grid, a ground coffee is obtained.

In fact, during the expansion, the roasted coffee is expelled under pressure through the grid and is therefore instantly ground, provided that the grid used is calibrated according to the grind which it is desired to obtain.

The steam used may be wet steam, but dry steam can also be used.

The example below will make it possible to demonstrate other characteristics and advantages of the present invention.

EXAMPLE 1

A closed pressure-resistant container is used which is provided with a loading orifice closed by a lid by means of which the green coffee can be introduced, the container being, in addition, provided with a steam inlet and, in the bottom part, with a valve for placing the container under atmospheric pressure, the conduit controlled by this valve having a grid.

A quantity of about 3 kg of green coffee is introduced, followed by steam at a pressure of 30 bar. The green coffee is left in the presence of the steam for period of 45 seconds and the pressure is suddenly released by opening the lower valve.

Under the action of the sudden decompression, the roasted coffee is expelled through the grid and a coffee is obtained which has the characteristics of a ground roasted coffee.

Of course, if the grid is removed, an unground roasted coffee is obtained.

A sample of green coffee roasted in a traditional manner makes it possible to observe a similarity in the flavor profiles and in particular to observe that the drinks obtained have quite similar organoleptic characteristics.

The advantages of this technology are that the duration of the roasting is very short and that the flavors generated during the roasting can be easily recovered.

The heating being of a very limited duration, there is no undesirable by-product such as benzopyrene, neither is there any risk of ignition since the product is kept under steam.

The disadvantage of the process as used in the example is that the product leaving the reactor is wet; it may therefore be necessary to dry it or it should be treated immediately or stored under rigorously hygienic conditions; it is also obviously possible immediately to prepare an extract which will be freeze-dried or spray-dried, if necessary, and in this case the water content does not really constitute a problem.

It is also possible, as mentioned above, to solve this problem partially by no longer using wet steam but dry steam.

In a variant of the process, the steam can also be produced in situ by introducing water into a reactor of the heat-retaining bomb type which is then heated in order to reach the desired pressure.

I claim:

1. A process for obtaining a around roasted plant material comprising the steps of:
   subjecting the plant material to steam at a pressure greater than or equal to about 5 bar to roast the plant material and
   releasing the pressure to expel the plant material through a grid to grind said roasted plant material.

2. A process for roasting according to claim 1, wherein the plant material is subjected to the steam for 2 minutes or less.

3. A process according to claim 1, wherein the plant material is green and is subjected to a pressure ranging between 9 to 30 bar.

4. A process according to claim 2, further comprising the step of introducing the plant material into a sealed container before subjecting the plant material to steam.

5. A process according to claim 4, further comprising the step of adding water to the container and heating the container to produce steam.

6. A process according to claim 1, wherein the pressure is released in 1 minute or less.

7. A process according to claim 1, wherein the steam is dry steam.

8. A process according to claim 1, further comprising the step of drying the ground plant material.

9. A process according to claim 1, wherein the plant material is derived from coffee, cocoa or chicory.

10. A process according to claim 1, wherein the plant part is a bean.

11. A process according to claim 4, wherein the container is a roasting vessel.

* * * * *